United States Patent [19]
Spickelmire

[11] Patent Number: 5,912,029
[45] Date of Patent: Jun. 15, 1999

[54] FISH ATTRACTING COMPOUND AND METHOD OF PRODUCING SAME

[76] Inventor: James Spickelmire, 724 S. "C", Grangeville, Id. 83530

[21] Appl. No.: 09/079,318

[22] Filed: May 14, 1998

[51] Int. Cl.⁶ .................................................. A01K 85/00
[52] U.S. Cl. ................................ 426/1; 426/805; 424/84; 424/405; 424/410; 424/489
[58] Field of Search .......................... 426/1, 805; 424/84, 424/410, 405, 489

[56] References Cited

U.S. PATENT DOCUMENTS

| | | | |
|---|---|---|---|
| 2,827,376 | 3/1958 | Breuer | 426/1 |
| 4,826,691 | 5/1989 | Prochnow | 426/1 |
| 5,174,998 | 12/1992 | Ijitsu et al. | 424/410 |

*Primary Examiner*—Milton Cano
*Attorney, Agent, or Firm*—Wells, St. John, Roberts, Gregory & Matkin P.S.

[57] ABSTRACT

A compound for attracting fish is disclosed which may be applied as a coating on an article. The compound when applied as a coating on an article will progressively dissolve in water and release a fish attractant. The compound includes (a) water soluble jell forming component, (b) a water soluble adhesive component, (c) a carrier component, and (d) a fish attractant component. The compound is produced by mixing the fish attractant with the water soluble carrier and combining the mixture with the water soluble adhesive and jell forming component.

20 Claims, 1 Drawing Sheet

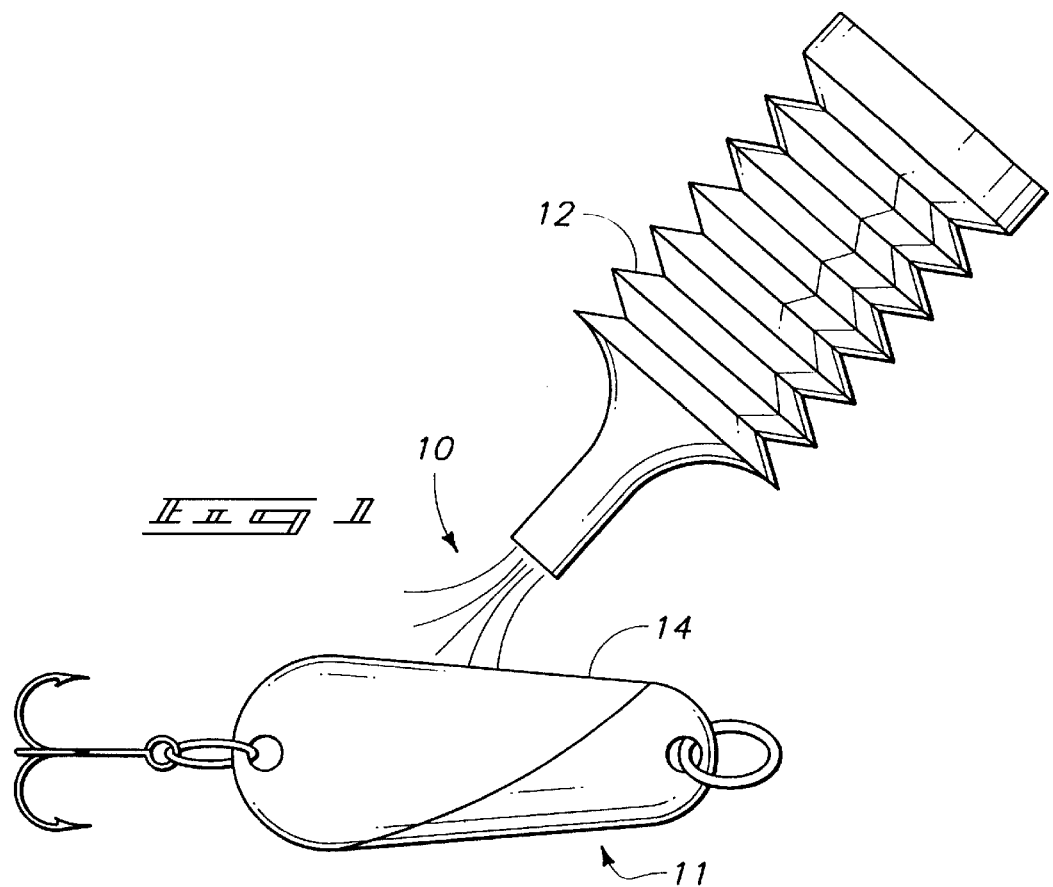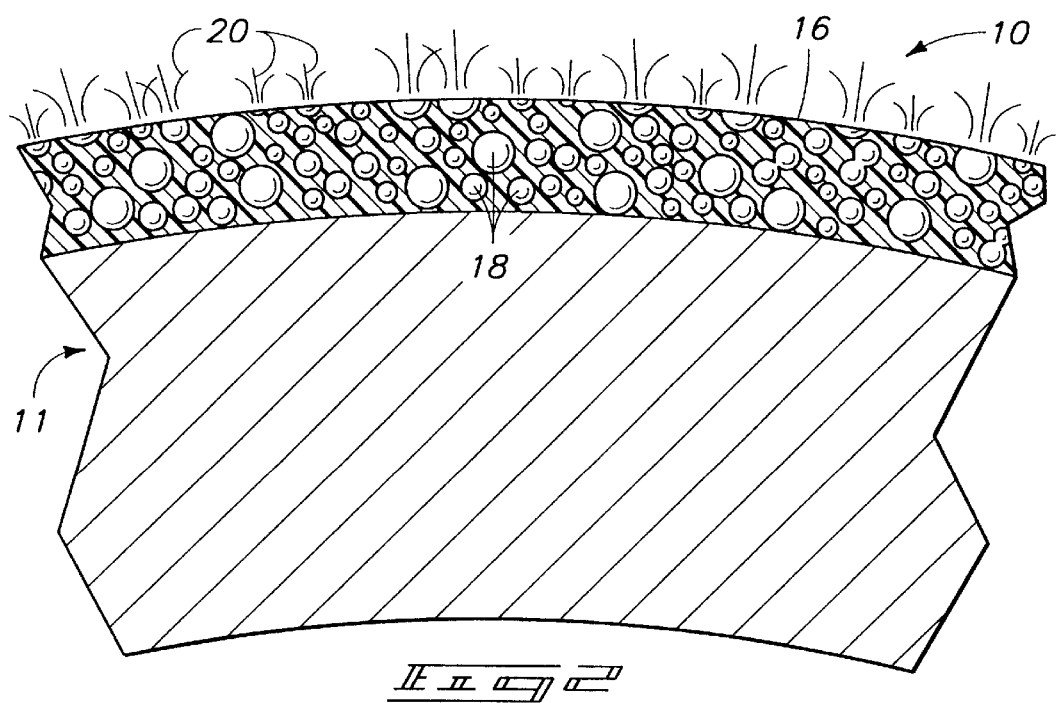

FISH ATTRACTING COMPOUND AND METHOD OF PRODUCING SAME

TECHNICAL FIELD

The present invention relates to compounds used for attracting fish.

BACKGROUND OF THE INVENTION

Fish are attracted to the scent of food. Thus many bait manufacturers apply scent to bait. As an alternative, fishermen will often place "chum" in the water while fishing. In the later situation, the scent emitting from "chum" or other materials can be confused with the actual bait. Further, when casting, trolling or other fishing operations in which the bait is moved, the scent left by chum is left behind unless it too is carried along separately from the actual bait. Further, prepared bait is typically used with a hook designed for reception of bait, rather than the typical bare hook or hooks found on many forms of fishing lures. Placement of bait on lure hooks will often adversely affect the performance of the lure, which is typically designed to move in a prescribed manner through the water.

Until advent of the present invention, and to the present inventor's knowledge, no dry long lasting attractant has been produced in a compound that can be applied as a coating on an existing lure or other article that will dry in air but will slowly dissolve in water.

The present invention therefor has for an object, provision of a fish attracting compound that may be applied as a dry powder to existing fishing lures or other objects and when wetted will coat the lure, then, after drying will function as a slowly dissolving coating, releasing fish attractant as dissolution occurs.

The above and still further objectives will be understood from reading the following description.

BRIEF DESCRIPTION OF THE DRAWINGS

Preferred embodiments of the invention are described below with reference to the following accompanying drawings.

FIG. 1 is a perspective view showing application of the preferred compound to a fishing lure; and FIG. 2 is a diagrammatic view of the compound applied as a coating to an article and resulting dissolution of the coating and release of a fish attractant in water.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A preferred form of the present compound or substance for attracting fish, includes a mixture of water soluble jell forming component, a water soluble adhesive component, a carrier component, and a fish attractant component. The components are configured in a mixture which may be applied to an article which upon exposure to water will progressively release the fish attractant component into the water.

In a preferred example, the water soluble jell forming component is a hydroxypropyl methylcellulose material, used most preferably in a powder form. The presently preferred methylcellulose is commercially available and is sold under the trademark "METHOCEL E4M", produced by Dow Chemicals and distributed by Van Waters and Rogers at 4515 East Wisconsin, Spokane, Wash. 99212.

The preferred water soluble adhesive component is also a commercially available poly(oxyethylene)glycol product, sold under the trademark "POLYOX WSR 301" produced by Union Carbide and distributed by the same corporation and at the same address provided above.

The above two components may be mixed in a variety of ratios by volume, within a range of approximately 1:1 (one part adhesive component to one part jell forming component), to approximately 1:10 (one part adhesive component to ten parts jell forming component).

The mixture ratio of jell forming and adhesive components has an effect upon dissolution time of the final compound when applied to an article and submerged in water. High jell forming component content (within the approximate stated range) results in a compound with quick dissolution time and consequent quick release of the fish attractant component. Low jell forming component content results in slow dissolution and consequent slow release of the attractant component.

The above preferred range of jell forming and adhesive components allows the producer latitude to vary the dissolution time according to the potency or nature of the fish attractant used. For example when an attractant concentrate is used (such as anise concentrate), a low jell forming content may be desirable.

The carrier component, in preferred forms, is granulated sugar. Sugar will dissolve well in water and performs well as a carrier in the present compound. Sugar also has the added benefit of having fish attracting qualities. Other water soluble carbohydrate material could also be used as the binder but sugar is most preferred at this time.

The fish attractant may be selected from a variety of commonly available and recognized attractants. Examples are salmon eggs, anise, blood, dairy products (such as cheese), mollusks, fish parts, crustacean parts, or other similar materials that when dispersed as particulates in water, will attract fish. It is preferred that the attractant be provided in dry powder form to facilitate production and use of the present compound. However, this is not a requirement especially in instances where the attractant is water soluble.

The preferred process for producing the present compound in a configuration for coating an article and for the subsequent release of fish attracting particles includes the steps described below. The steps are not presented in a specific chronological order, unless specifically noted.

It is preferred that a diluted fish attractant solution be prepared. This is advantageously accomplished by mixing water with the selected fish attractant to produce a diluted fish attractant solution. In situations where the attractant is in liquid form, additional water may not be necessary. However in the preferred process, it is desirable to start with a dry or dried attractant material.

Next, the solution of water and attractant is mixed with a water soluble carrier to form a paste. This step is preferably accomplished with dry, granulated sugar as the carrier. Enough of the solution is stirred together with the sugar to attain a paste consistency, rather than a liquid. The attractant thus becomes suspended in the carrier.

In the next successive step, the paste is allowed to dry. Water previously used in the solution is allowed to evaporate, either naturally in air at room temperatures, or by application of low heat to speed the evaporative process. The mix will harden to a solid state as the water evaporates.

Next, the dried paste is formed into a powder. This step is preferably accomplished by mechanical means, either by hand or using an appropriate blending or chopping apparatus.

Now the carrier and attractant are in a suspension, ready for the next step in which the powdered mix is combined with a powdered water soluble adhesive and a jell forming powder. The preferred adhesive and jell forming components are described above, and are blended themselves in the desired ratio also previously discussed.

The ratio of powdered mix (the attractant and carrier) to the blend (of adhesive and jell forming components) may vary according to the nature of the attractant and the desired amount of the attractant to be released. The preferred range by volume is 1:1 (one part adhesive and jell forming blend to one part of the powdered mix of sugar and attractant), to approximately 1:20 (one part adhesive and jell forming blend to twenty parts of the powdered mix of sugar and attractant). Higher content of the mix (sugar and attractant) will result in more attractant being released when the compound is applied to an article and the article is submerged in water.

Once the compound is complete, a final step may be placing measured or metered amounts of the compound in a spray dispenser for use in coating articles with the compound prior to use.

A preferred use of the present compound may be understood with reference to FIGS. 1 and 2 of the drawings. There, the compound, designated by reference numeral 10, is shown carried in a spray dispenser 12. A "puff" type mechanical dispenser 12 has been used effectively to dispense the compound 10 in a dry powder form on an article 11 such as a fishing lure 14.

In order to achieve a desirable coating of the present compound, the article is first wetted with water. The powdered compound is then sprayed or "puffed" onto the wet article. The water on the article will wet the compound, causing partial dissolution of the compound contents. The result is that the adhesive, jell and carrier will form a tacky coating 16 attaching the attractant to the article.

The coating 16 will dry in air and retain or encapsulate the attractant, as diagrammatically shown at 18. The coating produced with the components described above is relatively transparent so the lure surface is not visually obscured by the coating. Further, the coating will normally remain on the article until such time that the article is submerged or otherwise exposed to water. At such time, the adhesive, carrier, and jell will slowly dissolve and progressively release the attractant into the water. The process is shown diagrammatically in FIG. 2 where the attractant 18 is shown as circular particles suspended in the coating 16. The diagram indicates dispersion 20 of the attractant as is becomes exposed to the water, progressively will dissolution of the coating.

Once the article is removed from the water and is again exposed to air, the coating 16 will dry again and seal the remaining attractant for future use. The coating will remain useful until it completely dissolves or is intentionally removed from the article.

It should be noted that other materials could be included in the compound. For example highly reflective flakes or "sparkle" (not shown) could be added to the compound to increase visibility of the article, and thereby increase the impact of the coating to visual as well as olfactory stimulation. Still further, solid coloration could be added to the compound for similar effect.

It compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A compound for attracting fish, comprising a mixture of:

a water soluble jell forming component;

a water soluble adhesive component;

a carrier component; and a fish attractant component;

said components being configured in a mixture which is capable of being applied as a coating to an article which upon exposure to water will progressively release the fish attractant component into the water.

2. The compound of claim 1 for attracting fish, wherein the water soluble jell forming component is methylcellulose.

3. The compound of claim 1 for attracting fish, wherein the coating is substantially transparent.

4. The compound of claim 1 for attracting fish, wherein the water soluble jell forming component is proportional by volume to the adhesive component by a ratio of one part adhesive component to between approximately one and ten parts jell forming component.

5. The compound of claim 1 for attracting fish, wherein the carrier component is sugar.

6. The compound of claim 1 for attracting fish, wherein the carrier component is granulated sugar.

7. The compound of claim 1 for attracting fish, wherein the adhesive is poly(oxyethylene)glycol.

8. The compound of claim 1 for attracting fish, wherein the water soluble jell forming component is hydroxypropyl methylcellulose and the carrier component is granulated sugar.

9. A compound configured for coating an article and subsequent release of fish attracting particles, comprising:

a water soluble jell forming component;

a water soluble adhesive component;

a water soluble carrier component;

a fish attractant component; and wherein the components are mixed in a flowable powder form.

10. The compound of claim 9 wherein the water soluble jell forming component is hydroxypropyl methylcellulose.

11. The compound of claim 9 for attracting fish, wherein the carrier component includes sugar.

12. The compound of claim 9 for attracting fish, wherein the adhesive component is poly(oxyethylene)glycol.

13. The compound of claim 9 for attracting fish, wherein the water soluble jell forming component is hydroxypropyl methylcellulose and the carrier component contains sugar.

14. A process for producing a compound configured for coating an article for subsequent release of fish attractant when the article is submerged in water, comprising the steps of:

providing a fish attractant in a fish attractant solution;

mixing the fish attractant solution with a water soluble carrier to form a paste;

drying the paste;

forming a powder of dried paste; and mixing the dried paste powder with a powdered water soluble adhesive and a water soluble jell forming powder.

15. The process of claim 14 including the step of combining the powdered water soluble adhesive and jell forming powder in a ratio of approximately one part by volume of water soluble adhesive with a range of approximately one and ten parts of the jell forming powder.

16. The process of claim 14 wherein the water soluble jell forming powder is hydroxypropyl methylcellulose.

17. The process of claim 14 wherein the carrier includes sugar.

18. The process of claim 14 including the further step of placing the compound in a spray dispenser.

19. The process of claim 14 wherein the water soluble jell forming powder is hydroxypropyl methylcellulose and wherein the carrier includes dry granulated sugar.

20. A process for producing a compound configured for coating an article for subsequent release of fish attractant when the article is submerged in water, comprising the steps of:

mixing a fish attractant with a water soluble carrier; and combining the mixed fish attractant and carrier with a water soluble adhesive and a water soluble jell forming component.

* * * * *

UNITED STATES PATENT AND TRADEMARK OFFICE
CERTIFICATE OF CORRECTION

PATENT NO.    : 5,912,029
DATED         : June 15, 1999
INVENTOR(S)   : James Spickelmire It is certified that error appears in the above-identified patent and that said Letters Patent is hereby corrected as shown below:

Col. 3, 1. 31,32:   Replace "dis-pense" with --dis-perse--

Col. 3, 1. 53:      Replace "is" with --it--

Col. 3, 1. 54:      Replace "will" with --with--

Signed and Sealed this

Fourth Day of July, 2000

Attest:

Q. TODD DICKINSON

Attesting Officer     Director of Patents and Trademarks